Nov. 18, 1941.   V. H. A. VON TADDEN   2,263,281
APPARATUS FOR DISPLAY SIGNS, SCOREBOARDS, AND THE LIKE
Filed July 22, 1940   5 Sheets-Sheet 1

INVENTOR.
Victor H. A. von Tadden.

INVENTOR
Victor H. A. von Tadden.

Nov. 18, 1941. V. H. A. VON TADDEN 2,263,281
APPARATUS FOR DISPLAY SIGNS, SCOREBOARDS, AND THE LIKE
Filed July 22, 1940 5 Sheets-Sheet 3

INVENTOR.
Victor H. A. von Tadden.

Nov. 18, 1941.  V. H. A. VON TADDEN  2,263,281
APPARATUS FOR DISPLAY SIGNS, SCOREBOARDS, AND THE LIKE
Filed July 22, 1940  5 Sheets-Sheet 4

INVENTOR.
Viktor H. A. von Tadden

Nov. 18, 1941.  V. H. A. VON TADDEN  2,263,281
APPARATUS FOR DISPLAY SIGNS, SCOREBOARDS, AND THE LIKE
Filed July 22, 1940  5 Sheets-Sheet 5

INVENTOR.
Victor H. A. von Tadden.

Patented Nov. 18, 1941

2,263,281

UNITED STATES PATENT OFFICE 2,263,281

APPARATUS FOR DISPLAY SIGNS, SCOREBOARDS, AND THE LIKE

Victor H. A. von Tadden, New York, N. Y.

Application July 22, 1940, Serial No. 346,716

5 Claims. (Cl. 40—28)

This invention relates in general to apparatus for display signs, score boards and the like, and is particularly concerned with an apparatus in which light is channelled from a light source and selectively distributed to a mosaic display board in such a manner as to designate letters, characters or designs. The light channelling elements are arranged in series or unit blocks and capable of selection to represent specific letters, characters, designs, or portions thereof, a sufficient number of such series or unit blocks being arranged in suitable relation to each other in such a manner that words, sentences, events and the like, or portions of ornamental designs may be readily displayed in illuminated correlation.

One of the objects of the present invention is to effect the manipulation and control of such equipment by means of control apparatus.

Another object of the present invention is to provide a device in which the moving or the setting of the character or design selection equipment is operated automatically so that the characters or designs displayed by the mosaic will be controlled by the selection equipment.

A further object of the invention is to provide a display device wherein the likelihood or chance of inaccuracy is very remote.

A still further object of the present invention is to provide a device which is made up of a relay and other electrical apparatus of long proven qualities of endurance and dependability.

A further object of the present invention is the provision of remote control means for manipulating the display apparatus or mosaic from a remote point.

A still further object is to provide novel and improved means for displaying a series of characters which are automatically selected and displayed in succession.

Another object resides in the novel combination of parts and circuits employed for displaying characters at pre-determined intervals of time.

Still another object resides in the provision of novel and improved means for displaying a message information upon a display sign including a detachable portion of the sign upon which certain information is displayed.

A further object is to provide a device which can be manufactured economically and possesses the qualities of simplicity and durability.

Another object of the present invention is the provision of means for enabling the display device to repeat a series of characters or message automatically after making a complete cycle of operations.

A still further object of the present invention is to provide means for easily changing the message displayed by the device.

A further object of the device is to provide means included within the device for easily changing the coloring of the various characters or designs displayed while the device is in operation.

There are many other features and objects of the invention not specifically set forth which will be apparent to those skilled in the art, as the description of the invention progresses.

I attain these and other objects by a mechanism illustrative of several embodiments of the invention shown on the accompanying drawings, forming a part of this specification in which:

Figure 8 represents diagrammatically the front of a sign, score board or the like comprising thirty-five unit blocks arranged in five rows and illustrating some selective operation of elements in the several blocks to represent alphabetical characters, numerals and the like.

Similar numerals of reference are employed to designate similar parts throughout the several views of the drawings.

For convenience of illustration and explanation, I have herein shown and described my invention as applied to the illuminative control of thirty-five unit blocks or groupings in series of twenty-five light channelling elements each, it being understood that each unit block or series, might represent any combination or plurality of such light channelling elements forming a component part of a sign, score board, ornamental design or other devices for illumination, so that I do not limit myself in this respect. In other words I do not restrict myself to the display of letters and characters alone as herein depicted, since the same method and apparatus may be used for signs and decorative devices in which change of effect is desirable, and likewise any desired number of light channelling elements, or equivalent visualizing devices may be grouped in a series or block. And in this connection it is to be understood that by the term light channelling elements as used herein, I wish to include and designate lucite or any other suitable visualizing device that may be substituted therefor.

Figure 1:
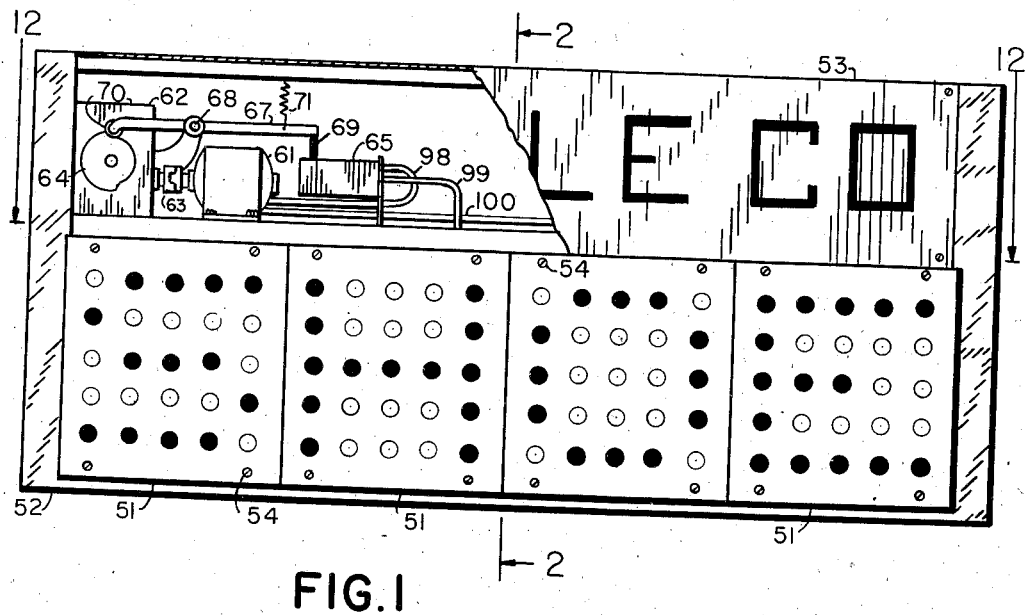
Figure 1 is a front view of the apparatus showing certain of the elements filled in solid for the characters selected, and a part of the sign broken away to show more clearly the control mechanism for automatically operating the device.
Figures 2, 3:
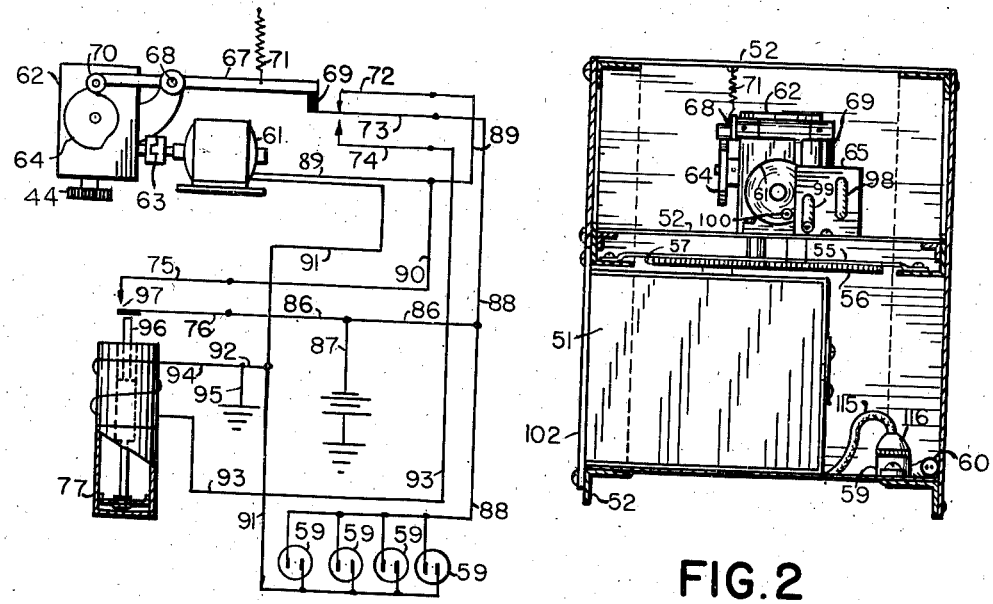
Figure 2 is a sectional view of Figure 1 at the line 2—2 showing one side of the control mechanism and mosaic unit.
Figure 3 is a circuit diagram illustrating the electrical connections of the mechanism within the display apparatus.
Figure 12:
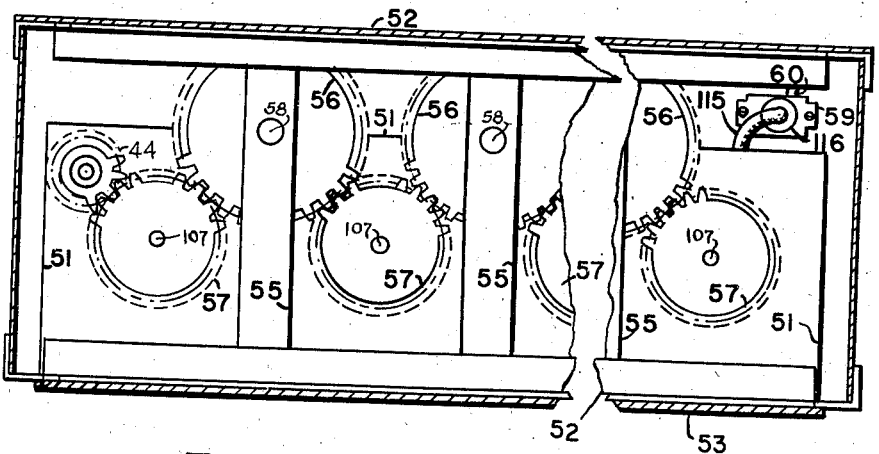
Figure 12 is a sectional view of Figure 1 taken along the line 12—12 showing certain of the operating mechanism used in conjunction with a plurality of mosaic units.

With this understanding, I herein show on Figures 1, 2 and 12 one embodiment of my invention as a sign having a plurality of mosaic units 51, mounted on a frame structure 52, with screws 54 and having a removable strip 53 thereon which may be used as a fixed sign or advertising display. The frame or housing 52 carries a plurality of cross members 55, as shown in Figures 2 and 12, which have attached thereto, by means of studs 58, a plurality of rotatably intermediate driving gears 56 which mesh with the mosaic unit gear 57 mounted on the mosaic unit 51 as will be described in detail in conjunction with the mosaic unit.

At the rear portion of the structure 52 and adjacent to the mosaic unit 51 are mounted a plurality of electric receptacles 59 connected to a source of electric power by means of the cable 60, mounted within the frame 52. Over the mosaic units 51, I have shown a motor 61, Figures 1, 2 and 3, having attached thereto a gear box 62 by means of a clutch 63 which drives the speed reducing mechanism within the box 62. Fixedly mounted, on one side of the gear box, on a shaft is a cam 64 which operates the switching contacts 72, 73 and 74 within the casing 65 by means of a lever 67 which is pivoted at the stud 68 and has attached on one end thereof an electric insulating member 69, and on the opposite end of the lever 67 is mounted a rotatable roller 70. Attached to the lever 67 and at the portion comprising the number 69 is a spring 71 having one end thereof fastened to the frame 52 so that the roller 70 will always be in contact with the cam 64. The functioning of these parts will be better understood from the description of the electric circuit diagram wherein I describe in detail the purpose of the operating mechanism within the frame 52.

Referring to Figure 1 specifically, I have shown in solid as black discs certain of the mosaic elements forming the letters S, H, O and E, which are made up of the light channelling elements having light passing through them, those which do not have light passing through them at this particular setting I have shown as circles in order to better illustrate the characters formed in the mosaic.

Now refer to Figure 3, the switching contacts 72, 73, 74, 75, 76 and a dash pot relay 77 are all mounted within the switch casing 65.

The motor 61 is shown connected on one side of the winding through the conductor 89 to the contact 72 to the contact 73 by way of conductor 88 to the battery by means of conductors 86 and 87 and the opposite side of the motor winding is connected to ground by means of conductors 91, 92 and 95, thus making a complete circle and causing the motor 61 to operate.

As soon as the motor 61 starts to revolve, the clutch 63 transmits the rotation to the gear box starting the cam 64 rotating and when the high part of the cam 64 comes in contact with the roller 70 mounted on the lever 67, which is fulcrumed on the stud 68, the roller end of the lever 67 moves upward and the opposite end of the lever having a member 69 mounted thereon moves downward thereby opening the circuit between the contacts 72 and 73 stopping the motor. At this time the contact 73 transfers battery potential to contact 74 thence to the dash pot relay 77, by means of the conductor 93 and to ground by means of the conductors 94 and 95 making a complete circuit and operating the dash pot relay 77. The dash pot relay 77 includes a slow moving solenoid as is well known in the art, having one end of the plunger at 96 making contact with the electric insulator 97 mounted on the contact spring 76 and closing the contacts 75 and 76 when the relay operates.

When the contacts 75 and 76 are closed the contact 75 is connected to battery by means of conductors 86 and 87, and contact 75 is connected to the motor winding by means of conductors 90 and 89, and back to ground through conductors 91, 92 and 95 thus completing another circuit and again starting the motor 61, causing the cam 64 to rotate and transfer the engagement of contact 73 from contact 74 to contact 72.

As soon as the high part on the rotating cam 64 moves out from under the roller 70, the spring 71, which keeps the roller 70 in contact with the surface of the cam causes the contact 73 to move away from the contact 74 and break the circuit to the dash pot relay 77 and deenergize it and at the same time make contact with the contact 72 thus keeping the motor 61 operating and allowing the dash pot relay 77 to return to a normal unoperated position, thus making a complete cycle of operations. This cycle of operations is repeated automatically.

The conductors of Figure 3 are formed in cables 98, 99 and 100 in a manner well known in the electrical art.

Figure 4:
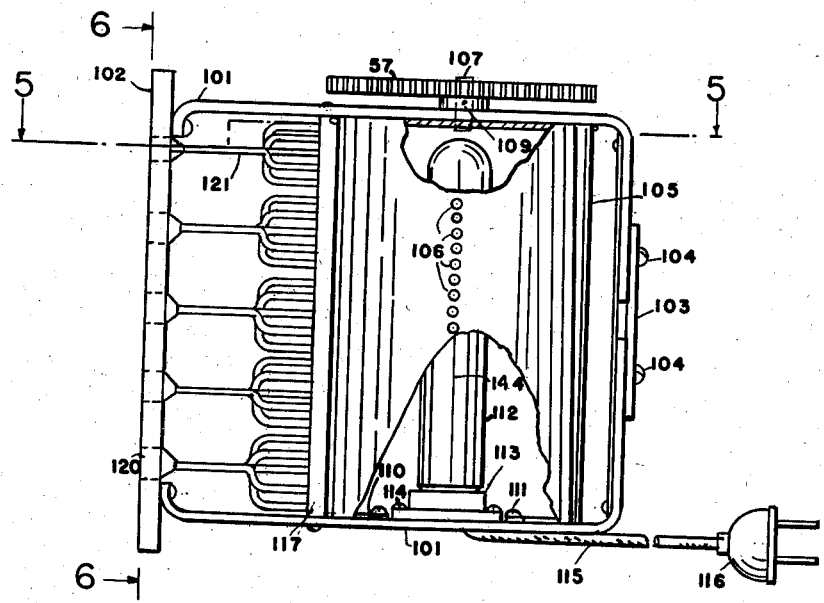
Figure 4 is a side view of the mosaic showing part of the casing removed and the control cylinder partly broken away.
Figure 5:
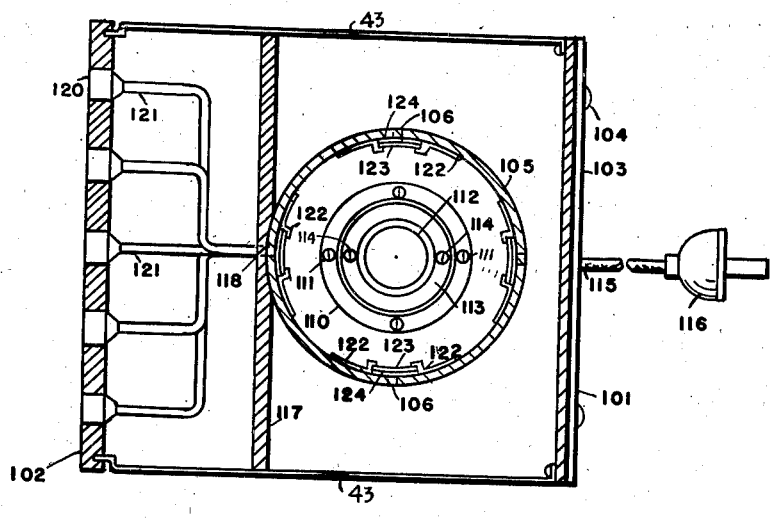
Figure 5 is a sectional view of Figure 4 along the line 5—5 showing the source of light, light channelling elements, detachable code strips within the cylinder, a plurality of coloring elements, and other elements of the structure.

Now refer to Figures 4 and 5 which show the mosaic unit, the numeral 101 indicates a frame having a panel 102 mounted on one end thereof by any suitable means. I have shown the frame 101 in two sections fastened together with a bonding plate 103 which is held in position in any suitable manner, as by the screws 104 for ease of assembly, however this bonding is not necessary as a one piece frame will function equally well. Rotatably mounted within the frame is a selecting cylinder or drum 105 having a series twenty-five apertures 106 arranged in a vertical row and I have shown four such series spaced at 90 degrees for illustrating purposes, however a greater or lesser number of apertures may be used with each series and more or less than four series of such apertures may be used.

The drum 105 has a stud 107 fixedly mounted in one end thereof in any suitable manner and passes through a bearing in the frame 101 and has a gear 57 mounted thereon and secured thereto by a pin 109. The gear 57 is the driving gear for the selecting unit. The opposite end of the selecting drum 105 is rotatably mounted over a ring 110 which is fixedly mounted to the frame 101 by means of screws 111. Thus when the gear 57 of the mosaic unit is driven, the selecting drum 105 which is connected directly to the gear will also rotate.

An electric lamp 112 is mounted in a receptacle 113, and the receptacle 113 is mounted on the frame 101 by means of the screws 114. The receptacle is connected to the plug 116 by means of the cable 115.

Within the frame and adjacent to the drum is a light shoe 117 having twenty-five apertures 118 therein, in alignment with the drum apertures 106 for mounting the light channelling elements 121, such composed of light conducting material as lucite.

Figure 6:
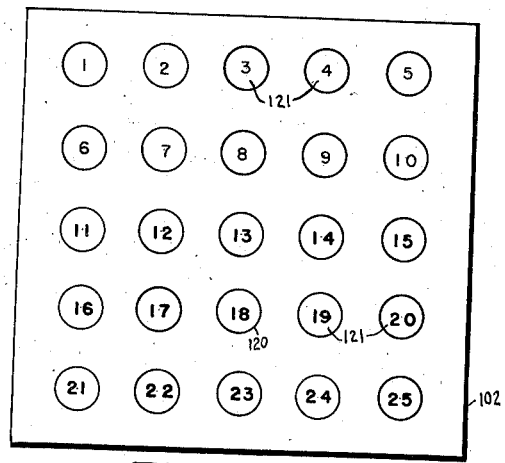
Figure 6 is a view taken along the line 6—6 of Figure 4 showing the arrangement of the light channelling elements.
Figure 8:
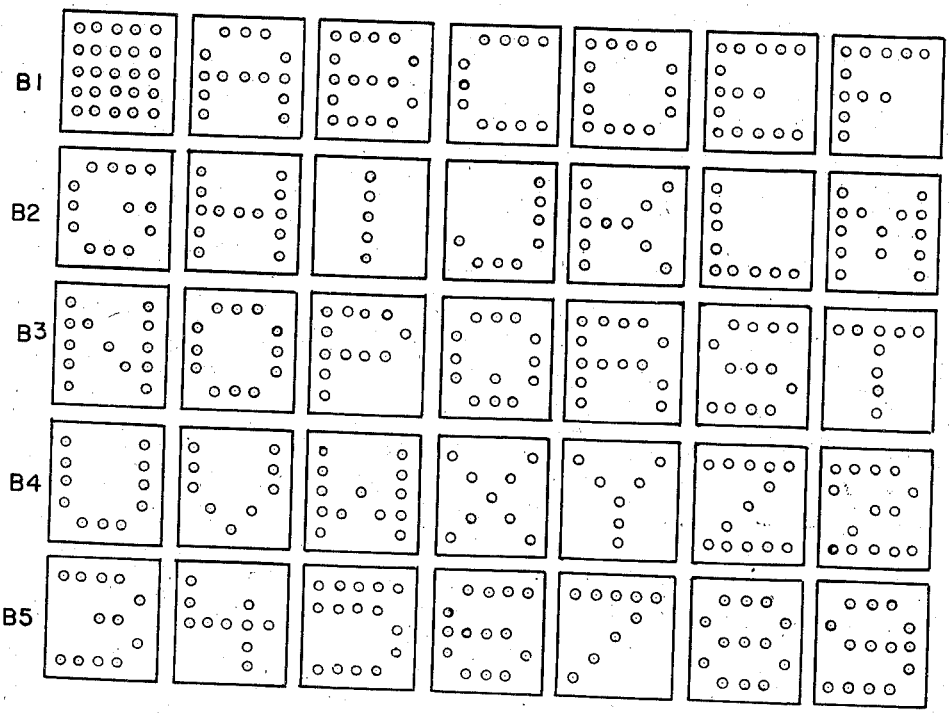

The panel 102 has a plurality of apertures 120 arranged as shown in Figures 1, 6 and 8 and between the panel apertures 120 and the shoe apertures 118 are a plurality of lucite rods 121 which transmit the light from the electric lamp within the cylinder to the apertures in the panel and form a block or unit of light discs as shown in Figures 6 and 8.

Figure 10:
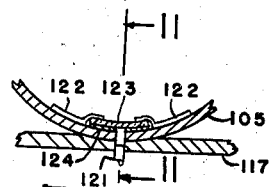
Figure 10 is a detail sectional view showing the way that the shoe, cylinder code strip and coloring strips are assembled.
Figure 11:
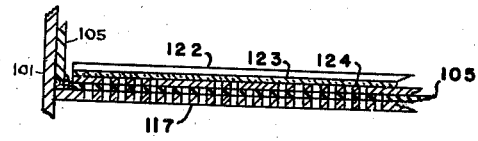
Figure 11 is a partial sectional view of the apparatus of Figure 10 at the line 11—11.

Within the selecting drum 105 is attached as by welding a series of code strip holders 122 mounted adjacent the selecting drum apertures 106 as shown in Figures 5, 10 and 11. In Figure 11, I have shown the combination of the cylinder 105, light shoe 117, the code bars 124, the coloring element 123 and the means for supporting.

A code strip 124 is fitted in the code strip holder 122 and, if a colored character is desired, a coloring element 123, such as a colored translucent Celluloid, is inserted within the code strip holder 122 and next to the code strip 124.

A plurality of light shields 43 are mounted on either side of the mosaic unit and fastened to the frame 101 to prevent the light from escaping from the mosaic unit.

Thus a different colored element 123 may be, if desired, inserted in each of the different operating positions thereby giving a different color effect to each character displayed on the ends of the lucite rods 121 exposed through the panels 102 as will be apparent as the description proceeds.

Figure 7:
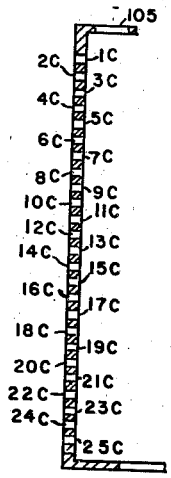
Figure 7 is a detailed sectional view illustrating the designations of the various apertures in the cylinder.
Figure 9:
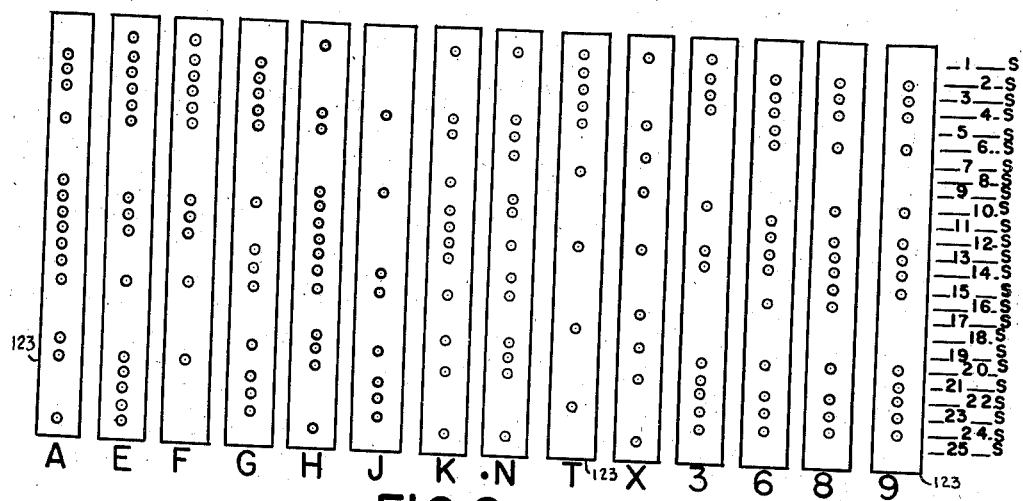
Figure 9 represents a plurality of typical code strips used in the selecting cylinder for selecting various characters on the mosaic.

Referring now to Figure 9 in which I have shown a few typical examples of code strips such as A, E, F, G, H, J, K, N, T, X, 3, 6, 8, 9, and I have shown on these code strips the position of aperatures from 1S, to 25S inclusive. These numbers correspond to the numbers 1, to 25 shown on the mosaic in Figure 6 and in the selecting drum 105 in Figure 7, I have shown a plurality of rows of apertures therein designated 1C to 25C.

For illustration I have shown twenty-five apertures throughout, although it will be understood that any number of apertures may be employed as found expedient in practice.

With this understanding I have herein shown on Figure 8, thirty-five unit blocks arranged in five horizontal rows designated respectively B1, B2, B3, B4 and B5 and designated the light channelling ends in each series or block by the consecutive numerals 1 to 25, although both the apparatus and principle are adapted to any number of rows or blocks and any number of blocks in a row, as may be found most expedient in practice. Each light channelling end in each block is connected to the source of light filament 144 through the light shoe 117.

For example, let it be assumed that the first four code strips shown in Figure 9 are inserted into the code strip holder 122 in the cylinder 105 and the first code strip with apertures therein to form the character A is in the position of the mosaic unit shown in Figure 5, and the code strip E is in the second position, F is in the third position, and G is in the fourth position of the selecting cylinder. The first letter which the light channelling elements expose would be the letter A and after the cylinder has rotated 90 degrees, the light would pass through the code strip and form the letter E on the mosaic followed by the letters F and G as the cylinder continues to rotate and thus the selecting cylinder completes a cycle of operations, the characters repeating themselves during subsequent rotations of the cylinder.

It is obvious that sufficient cylinder apertures, clips, and code strips could be used to form a complete alphabet, numeral or character units or any combination if so desired.

Figure 13:
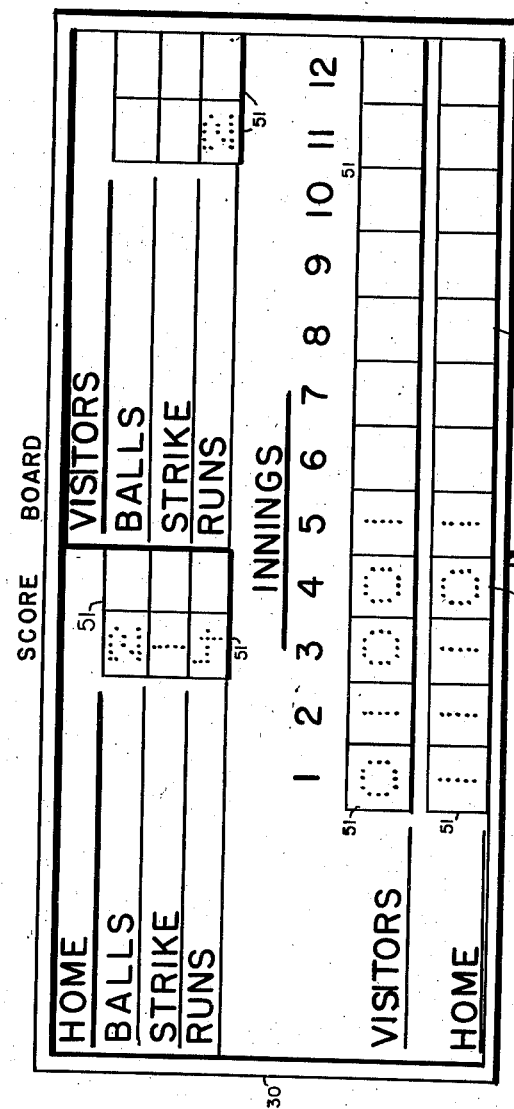
Figure 13 is a front view of a typical score board and control panel therefore according to one embodiment of the invention.
Figure 13:
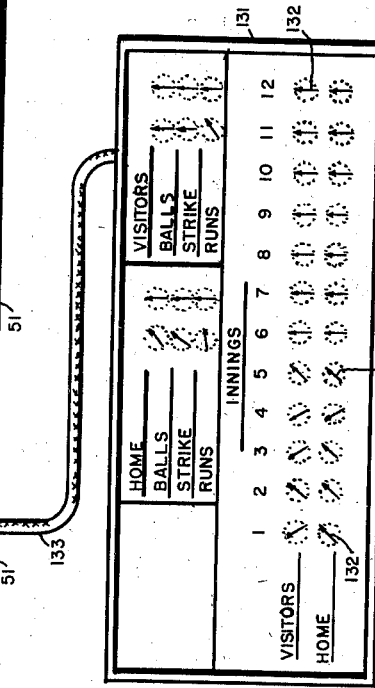

Referring to Figure 13 which shows another embodiment of my invention applied to a typical base ball score board, with mosaic units mounted thereon and a control panel which may be situated at a distance from the display board for the remote control thereof.

The numeral 130 indicates the display or score board having the words Home, Visitors, Balls, Strikes, Runs, Innings and the numerals 1 to 12 inclusive, including certain other markings, I have shown as painted thereon but they may be removable strips having the various words, numerals and lines thereon, and adjacent to the words Balls, Strikes, and Runs, I have shown a plurality of mosaic units 51.

A row of mosaic units 51 is disposed adjacent to the lower Visitors and Home, and under the numerals 1, to 12 indicating the number of runs for each inning.

The control panel 131 has markings thereon to correspond with the markings on the score board, and control switches 132 are positioned on the control panel 131 corresponding to the mosaic unit 51 which has eleven series of apertures in this embodiment, in the score board 130.

The score board apparatus could be operated directly by manually rotating the cylinder 105 to the desired position.

Figure 15:
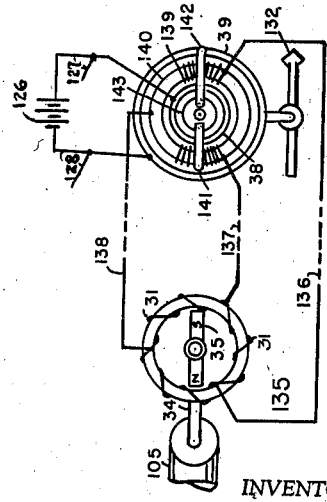
Figure 15 is an electric diagram illustrating the connection between a control switch and the selecting drum of one mosaic unit.
Figure 14:
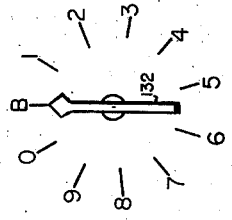
Figure 14 is an enlarged detail view of one of the control switches shown on the control board in Figure 13.

One of the aforementioned switches 132 is shown somewhat enlarged in Figure 14, having a pointer on one end thereof and markings indicating the numerals 1 to 9 and 0 inclusive and a blank position designated B, Thus when the pointer of any control switch 132 is turned, for example, to the numeral 6, the corresponding mosaic unit will display the numeral 6 on the mosaic as will be clearly apparent from the detailed description of the schematic electric diagram shown in Figure 15.

In Figure 15 there is represented one of the complete mosaic control units shown in diagrammatic form including a transmitter 134 and a receiver unit 135 for remotely indicating settings of the transmitter by selectively positioning a drum 105 of the mosaic unit 51.

The transmitter 134 may be of the type having means for varying the relative distribution of the currents transmitted by the conductors 136, 137 and 138 in accordance with the angular position of the transmitter control element 132.

The transmitter illustrated comprises a resistor 139, only a portion of which is shown for the sake of simplicity, a toroidally wound upon a ring or annular form 140 and a rotatable member 143 having wiper contacts 141 and 142 which are connected to a source of current and adapted to engage the resistor 139 in accordance with the setting of the control element 132.

The rotatable member 143 which is insulated from the wipers 141 and 142 and is connected mechanically to the control switch 132 in any suitable manner such that it rotates in unison therewith.

The wiper 142 makes contact with a feeder ring 39, and the wiper 141 is in contact with the feeder ring 38. The ring 39 is connected to one side of the battery and the feeding ring 38 is connected to the opposite side of the battery.

The receiving unit 135 includes a plurality of current conducting coils 31, disposed around the center or axis of the shaft 34 and a permanent magnet 35 secured to the drum 105 by the shaft 34 and rotatably mounted by suitable means as a unit assembly.

The drum 105, Figure 14, is provided with a plurality of rows of apertures 106 equal in number to the number of settable positions of the transmitting unit 134, each of the rows of apertures being associated with a code strip 124 adapted to control the illumination of the light channelling rods 121 to form the digits 1, to 9 and 0, on the mosaic, a code strip 124 having no apertures therein being employed for blocking the light rays from all of the elements 121 when the selecting drum is in its blank position.

From the foregoing description it is clear that by turning the transmitter switch 132 to a position corresponding to any numeral on the control panel, the cylinder 105 of the mosaic unit will move to a corresponding position thereby displayed a numeral on the mosaic unit in accordance with the setting of the transmitter switch.

Each of the mosaic units of Figure 13 is separately controlled by an associated transmitter 134, all of the control circuits 136, 137 and 138 being included preferably within the cable 133. Also a single battery 126 may be employed for all of the transmitters the wires 127 and 128 being employed for establishing the circuit connections from the battery to the feeder rings 38 and 39 respectively of each of the transmitters.

While this invention has been described with reference to several embodiments thereof, it is obvious that various changes may be made without departing from the spirit or scope of the invention and it is to be understood that the terms employed in the claims are terms of description rather than terms of limitation.

I claim:

1. In an apparatus of the character disclosed, comprising a plurality of mosaic units each unit having a plurality of apertures therein, a selecting cylinder rotatably mounted and having a plurality of apertures therein, a plurality of character code clips mounted within said selecting cylinder adjacent said cylinder apertures, a plurality of code strips for selecting characters and the like disposed within said clips and actuated by said cylinders to a selection position, a light shoe having apertures therein mounted within said mosaic unit and adjacent to said selecting cylinders and adapted to be brought in alignment with said cylinder apertures, a source of light within said cylinder, a plurality of light channelling elements having one end thereof inserted within said shoe apertures and the opposite end thereof exposedly mounted within said panel apertures and means for selectively operating said cylinder to cause certain of the light channelling elements to be illuminated in accordance with the character represented by the code strip in said selected position.

2. In a changeable sign of the characted disclosed, a plurality of mosaic units comprising a plurality of panels having a plurality of apertures thereon, a selecting cylinder rotatably mounted and having a plurality of apertures therein through which characters and numerals are selected, a plurality of code strips for selecting said characters and numerals, means for mounting the code strips within said cylinder, a light shoe having a plurality of apertures therein adapted to be brought in alignment with the apertures of said cylinder as the cylinder rotates, said light shoe being mounted within said mosaic unit and adjacent to said selecting cylinder, a plurality of light channelling elements having one end thereof inserted in said apertures of the light shoe and the opposite end thereof exposedly mounted within the apertures of said panel, a source of light, and means including a motor for causing said cylinder to rotate and bring said code strips successively into operation relation with said light channelling elements whereby the characters or numerals represented by the code strip is displayed on said mosaic unit by light received from said source.

3. In a mosaic unit, a separable frame, panels having a plurality of apertures therein mounted on said frame, a selecting cylinder rotatably mounted and having a plurality of apertures therein, a plurality of code clips mounted within said cylinder and adjacent said cylinder apertures, a plurality of code strips positioned within said cylinder and disposed within said code clips for selecting characters and the like, a light shoe having apertures therein mounted within said mosaic unit, a source of light within said cylinder, a plurality of light channelling elements having one end thereof inserted in said shoe apertures and the opposite end exposedly mounted in said panel apertures and means for operating said cylinder to cause various characters to be displayed on said mosaic.

4. In an apparatus of the character disclosed, comprising a plurality of mosaic units each unit having a plurality of apertures therein, a selecting cylinder rotatably mounted and having a plurality of apertures therein, a plurality of character code clips mounted within said selecting cylinder adjacent said cylinder apertures, a plurality of code strips for selecting characters and the like disposed within said clips and actuated by said cylinder to a selection position, a light shoe having apertures therein mounted within said mosaic unit and adjacent to said selecting cylinders and adapted to be brought in alignment with said cylinder apertures, a source of light within said cylinder, a plurality of light channelling elements having one end thereof inserted within said shoe apertures and the opposite end thereof exposedly mounted within said panel apertures, means for effecting the coloring of the various light channelling elements and means for selectively operating said cylinder to cause certain of the light channelling elements to be illuminated in color in accordance with the character represented by the code strip in said selected position.

5. In a changeable sign of the character disclosed, a plurality of mosaic units comprising a plurality of panels having a plurality of apertures therein, a selecting cylinder rotatably mounted and having a plurality of apertures therein through which characters and numerals are selected, a plurality of coloring elements for coloring said characters and numerals, a plurality of code strips for selecting said characters and numerals, means for mounting the said coloring elements and said code strips within said cylinder, a light shoe having a plurality of apertures therein adapted to be brought in alignment with the apertures of said cylinder as the cylinder rotates, said light shoe being mounted within said mosaic unit and adjacent to said selecting cylinder, a plurality of light channelling elements having one end thereof inserted in said apertures of the light shoe and the opposite end thereof exposedly mounted within the apertures of said panel, a source of light, and means including a motor for causing said cylinder to rotate and bring said code strips successively into operation relation with said light channelling elements whereby the characters or numerals represented by the code strip is displayed on said mosaic unit, in color, by light received from said source.

VICTOR H. A. von TADDEN.